United States Patent
Ladra et al.

(10) Patent No.: US 8,040,017 B2
(45) Date of Patent: Oct. 18, 2011

(54) PIEZOELECTRIC ACTUATOR

(75) Inventors: Uwe Ladra, Erlangen (DE); Elmar Schäfers, Fürth (DE); Dietmar Stoiber, Fürth (DE); Bernd Wedel, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 254 days.

(21) Appl. No.: 12/307,328

(22) PCT Filed: Apr. 13, 2007

(86) PCT No.: PCT/EP2007/053612
§ 371 (c)(1),
(2), (4) Date: Jan. 2, 2009

(87) PCT Pub. No.: WO2008/003531
PCT Pub. Date: Jan. 10, 2008

(65) Prior Publication Data
US 2009/0309454 A1 Dec. 17, 2009

(30) Foreign Application Priority Data
Jul. 5, 2006 (DE) .......................... 10 2006 031 079

(51) Int. Cl.
*H01L 41/09* (2006.01)
(52) U.S. Cl. ...................................................... 310/317
(58) Field of Classification Search .................. 310/317, 310/328, 338
See application file for complete search history.

(56) References Cited

U.S. PATENT DOCUMENTS

| | | | |
|---|---|---|---|
| 6,218,769 B1 * | 4/2001 | Iino et al. | 310/328 |
| 7,116,033 B2 * | 10/2006 | Seki et al. | 310/317 |
| 7,157,830 B2 * | 1/2007 | Jansson et al. | 310/317 |
| 2004/0007941 A1 | 1/2004 | Yuasa | |
| 2005/0231140 A1 * | 10/2005 | Kataoka | 318/114 |

FOREIGN PATENT DOCUMENTS

| | | |
|---|---|---|
| DE | 199 00 474 A1 | 7/1999 |
| DE | 198 10 321 A1 | 9/1999 |
| DE | 199 44 733 A1 | 3/2001 |
| DE | 101 13 801 A1 | 10/2002 |
| DE | 103 31 057 A1 | 2/2005 |
| DE | 10 2004 003 838 A1 | 8/2005 |
| EP | 0 381 155 A1 | 8/1990 |
| EP | 0 439 425 A1 | 7/1991 |

* cited by examiner

*Primary Examiner* — Derek Rosenau
(74) *Attorney, Agent, or Firm* — Henry M. Feiereisen; Ursula B. Day

(57) ABSTRACT

A piezo actuator includes an adaptation element, which is configured to adapt the piezo actuator to a controller for inductive loads, particularly to a converter for actuating inductive loads. The adaptation element allows use of controllers or converters of numerical control systems, which normally are used for actuating servo motors. Therefore it is no longer necessary to provide specially designed hardware for the actuation of piezo actuators, but instead the above-mentioned controllers can be used. Furthermore, as a result of the adaptation element, the piezo actuators can be integrated in the bus of the numerical control system. This allows communication in real time via the NC bus.

9 Claims, 2 Drawing Sheets

000
PIEZOELECTRIC ACTUATOR

BACKGROUND OF THE INVENTION

The invention relates to a piezoelectric device. The invention also relates to a machine tool having at least one piezoelectric device.

Piezoelectric actuators can be used in many ways and they are therefore available in various forms such as, e.g. stacked actuators, disk translators, bender or tube actuators. Among others, one field of application of piezoelectric actuators is controlled vibration damping in machine tools.

Piezoelectric actuators are driven by means of power amplifiers which provide the required drive voltages. Here, the magnitude of the drive voltage depends on the type of piezoelectric actuator. Thus, there are low voltage actuators which supply drive voltages up to 100 volts or 200 volts and high-voltage actuators which supply drive voltages up to 600 volts, 1000 volts or 2000 volts.

In this context, the power amplifiers are adapted to the respective piezoelectric actuator. No uniform standards exist, so that in the case of a numerically controlled machine tool, apart from the numerical control with power amplifiers for the servo motors, other power amplifiers are required for the piezoelectric actuators. However, using additional electronic assemblies has many disadvantages: no direct coordination is possible between the numerical control which drives the servo motors and the piezoelectric actuators. It is not possible to achieve advantages of rationalization by means of large batch sizes. Service and spare parts management are not uniform. The commissioning and optimization strategy differs between the servo motors and the piezoelectric actuators. This doubles the required personnel.

There is thus no uniform software and hardware for servo drives and piezoelectric actuators. The piezoelectric actuators do not communicate via the bus of the numerical control but hardware different from this and incompatible with it is used for controlling the piezoelectric actuator mechanism, which stands in the way of any further use of piezoelectric actuators in machine tools.

SUMMARY OF THE INVENTION

It is therefore an object of the present invention to develop known piezoelectric actuators in such a manner that they can be driven by means of known numerical controls.

Piezoelectric apparatus according to the invention includes an adaptation element that is constructed for adapting a piezoelectric device to a controller for inductive loads, particularly to a converter for driving inductive loads. This adaptation element, allows the controllers or converters of numerical control (NC) systems, which are normally used for driving servo motors, to also drive piezoelectric devices. This dispenses with the necessity of providing specially designed hardware for driving piezoelectric devices in those numerical control (NC) systems. Instead, well-known controllers or converters can be used. This adaptation element also allows the piezoelectric devices to be integrated into the bus of the numerical control INC) system, which provides communication in real time with those piezoelectric devices via the numerical control (NC) bus.

It is preferably provided that the adaptation element essentially has a low-pass characteristic. This can be the low-pass characteristic of a first-, second- or higher-order low-pass filter, the low-pass filter being dimensioned in such a manner that essentially only components below the pulse frequency of the converter are forwarded to the piezoelectric actuator.

Thus, by means of the adaptation element, an impedance adaptation is achieved in such a manner that controllers such as, e.g. converters for driving servo motors can be used for driving the piezoelectric actuator. In this context, controllers or converters can be used that supply a pulse-width-modulated output signal, controllers that are frequently used in numerically controlled (NC) machine tools.

The adaptation element can have active and/or passive components such as, e.g. operational amplifiers. However, it is preferably provided that the adaptation element is formed by passive components so that the adaptation element has a simple structure and, at the same time, reliable operation is guaranteed. In this context, a piezoelectric actuator can be constructed of one piece with the adaptation element or, as an alternative, these two can be constructed as two separate components. In a preferred embodiment, it is provided that the adaptation element has at least one inductance. The inductance is dimensioned here in such a manner that the capacitive behavior of the piezoelectric actuator is compensated for by the inductance so that, e.g. converters for driving servo motors, which are constructed for driving inductive loads, can be used for driving the piezoelectric actuator. Furthermore, the inductance produces a smoothing of the current when using pulse-width-modulated signals.

It is also preferably provided that the adaptation element has at least one ohmic resistance. The ohmic resistance is dimensioned here in such a manner that harmonics of voltage pulses are damped and essentially only components below the pulse frequency of a controller or a converter are forwarded to the piezoelectric device. The adaptation element thus has a low-pass characteristic of a second-order low-pass filter.

Apart from the inductance and the ohmic resistance, the adaptation element can have further components. Furthermore, the inductance and the ohmic resistance can be arranged in parallel with one another with appropriate dimensioning. It is preferably provided, however, that the at least one inductance and the at least one ohmic resistance are arranged in a series circuit.

Furthermore, it is preferably provided that the piezoelectric actuator device and the adaptation element are arranged in a series circuit. In this arrangement, both the piezoelectric device and the adaptation element are connected to a controller.

The adaptation element can be used for driving a piezoelectric device using a single-phase controller that is constructed for controlling inductive loads. In a preferred embodiment, the adaptation element is connected to a first phase of a three-phase converter and the piezoelectric actuator is connected to a second phase of the three-phase converter so that three-phase controllers or converters by means of which servo motors are driven, e.g. in numerically controlled (NC) machine tools, can also be used. In this arrangement, the commutation angle of the unused phase is frozen.

In a further preferred embodiment of the invention, the piezoelectric apparatus has a measuring element. This can be a strain gauge by means of which the deflection of the piezoelectric device can be detected. This allows both open-loop operation and closed-loop operation. In this embodiment, the measurement signal is converted into an incremental sine/cosine signal. In this form, the signal can be supplied to a regulator which belongs to a controller or to a converter that normally drives servo motors.

Another preferred embodiment of the invention is a machine tool that has at least one piezoelectric apparatus constructed according to the invention. In this context, the machine tool has a controller or converter by means of which a three-phase servo motor is driven, for example. The converter can additionally have a regulator that provides position control for the machine tool. Alternatively, the software of the converter can be arranged in such a manner that only two of the three phases are used when a piezoelectric device having an adaptation element is connected to the converter instead of the three-phase servo motor.

BRIEF DESCRIPTION OF THE DRAWING

In the text which follows, the invention will be described by means of an exemplary embodiment which will be explained in greater detail with the aid of drawings, in which.

DETAILED DESCRIPTION OF PREFERRED EMBODIMENTS

Figure 1:
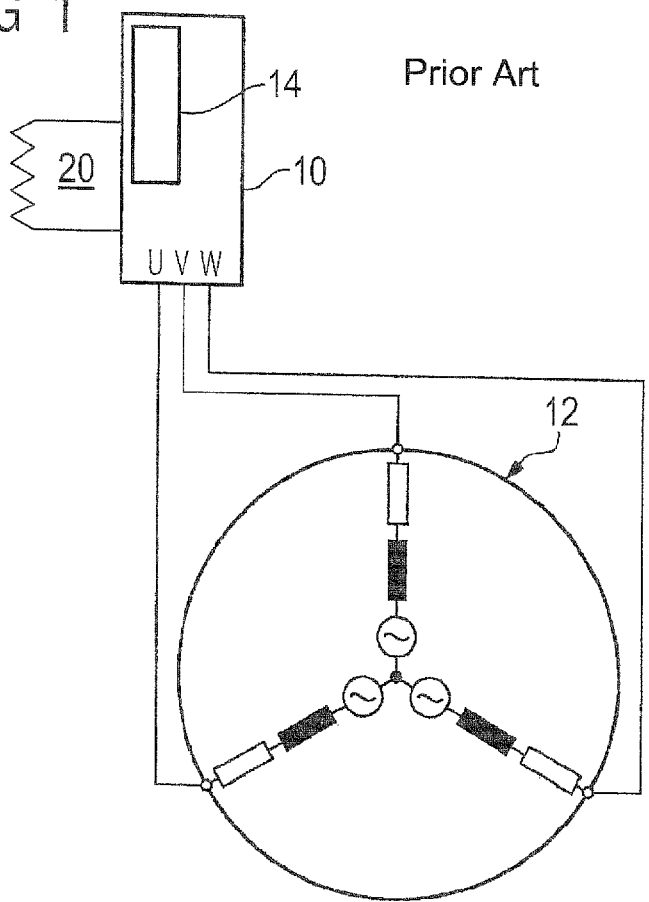
FIG. 1 shows a diagrammatic representation of a converter for driving a servo motor, known from the prior art.

A converter 10 is shown in FIG. 1, which is normally used for driving a three-phase motor such as, e.g. the servo motor 12 and, therefore, supplies a three-phase current at its three output terminals, U, V, W. In this arrangement, the converter 10 has a regulator 14 which, by comparing predetermined nominal data and measured actual data, determines a regulator quantity in such a manner that the actual data approach the nominal data until they correspond to it. In this arrangement, the actual data are detected by measuring means (not shown) and supplied to the regulator 14 (through lines not shown), as is well-known in the art.

The converter 10, in FIG. 1, has power amplifiers (not shown). The maximum output voltage of those power amplifiers is between 150 volts to 750 volts. To avoid high power dissipation when adjusting desired output voltages, power amplifiers for servo drives are provided with clocked or pulsed output stages. A desired output voltage is then provided by means of a corresponding duty ratio, that is to say, by means of pulse-width modulation.

In an electrical equivalent circuit, a three-phase motor 12 can be considered to be a series circuit of an ohmic resistance and an inductance, so that the three-phase motor 12 represents an inductive load for the converter 10.

Figure 2:
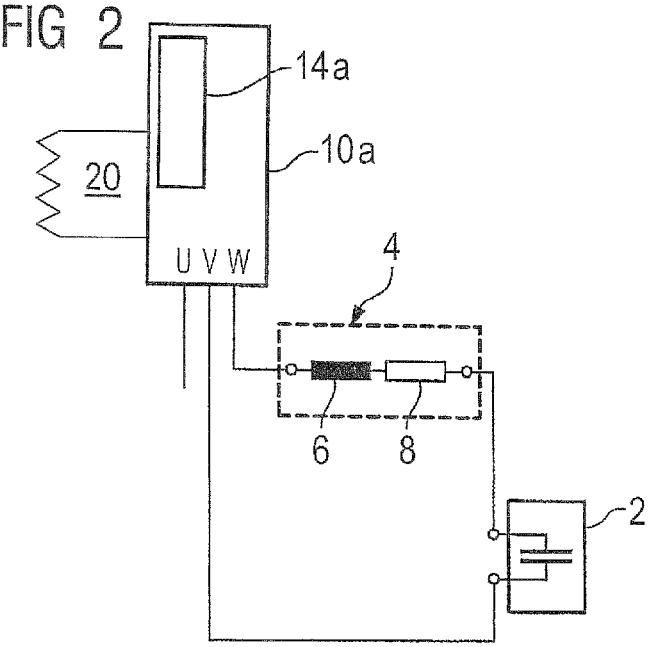
FIG. 2 shows a diagrammatic representation of a piezoelectric device having an adaptation element in accordance with the invention.

In contrast, a piezoelectric device 2, for example a piezoelectric actuator having an operating voltage between 100 volts and 1000 volts, depending on its type, can be considered a capacitance in the electrical equivalent circuit shown in FIG. 2, because the piezoelectric device 2 represents a capacitive load. Therefore, an adaptation element 4 formed by an inductance 6 and an ohmic resistance 8 is provided in a series with one of the three phases of the converter 10a in FIG. 2 and the piezoelectric device 2. In this arrangement, the inductance 6, together with the ohmic resistance 8, forms a filter having a low-pass effect that produces smoothing of the pulse-width-modulated output voltage of the converter 10a and, in particular, limits the magnitude of the current flowing through that filter, a current that otherwise would only be limited by the capacitive behavior of the piezoelectric device 2. Thus, current magnitudes are avoided that could otherwise result in a destruction of components in FIG. 2.

For example, if a piezoelectric device 2 having an operating voltage of 600 volts is used, and if the cut-off frequency of the filter is 1.8 kHz (aperiodic damping, no resonance), the square wave frequency of the converter 10a being 16 kHz, 1.5 mH is selected for the inductance and 15 ohms for the ohmic resistance. The thermal power dissipation is then approx. 100 watts whilst the attenuation at 16 kHz when the output voltage has a pulse frequency of 8 kHz) is −40 dB, which corresponds to a factor of 100. In this context, the usable frequencies for the piezoelectric device 4 can be extended up to frequencies of 1 kHz without any reduction in amplitude.

Furthermore, in the example in FIG. 2, the converter 10a is arranged for the capacitive load 4 in such a manner that the commutation angle of the unused phase is frozen, because and this phase is not used. Also, the converter 10a in FIG. 2 is arranged, e.g. by software, in such a manner that the output voltage of the converter 10a is regulated whilst current regulation is deactivated.

Figure 3:
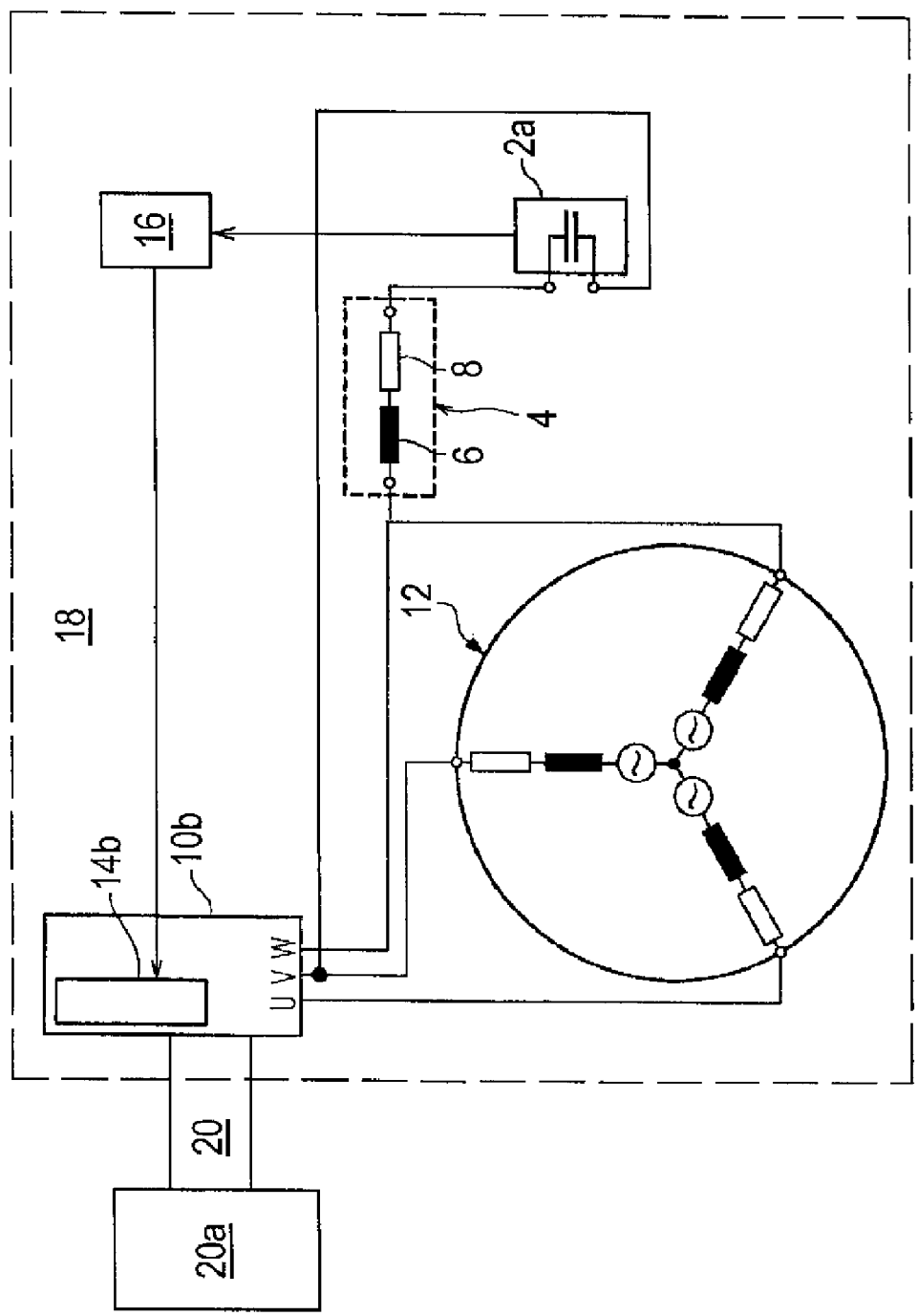
FIG. 3 shows a diagrammatic representation of an NC machine tool having an adaptation element in accordance with the invention.

In FIG. 3, a conventional NC controller 20a is connected by a conventional NC bus 20 to a conventional converter 10b providing outputs U, V and W, to a three-phase motor 12 in a conventional machine tool 18, as is well-known in the art. To control the position of the machine tool 18, the piezoelectric device 2a shown in FIG. 3 is a measuring element, specifically, a strain gauge. In FIG. 3 this strain gauge 2a supplies an analog signal as its output signal and the electronic signal converter 16 converts the analog output signal of that strain gauge 2a into an incremental sine/cosine signal, which is then supplied to the regulator 14b so that the conventional regulator 14b of an NC converter, such as the NC converter 10b shown in FIG. 3, can be used for driving both inductive loads such as this servo motor 12a, as well as the strain gauges, actuators, and other piezoelectric devices used in NC machine tools. If, however, there is no such piezoelectric position control measuring element, it should be noted that the electronic signal converter 16, used in the particular example that is shown in FIG. 3, is not required.

What is claimed is:

1. A piezoelectric apparatus for connection to a three-phase controller for inductive loads, said piezoelectric apparatus comprising:
a piezoelectric element connected to a first phase of the three-phase controller; and
an adaptation element connected to a second phase of the three-phase controller and to said piezoelectric element, said adaptation element adapting the piezoelectric element to the controller for inductive loads.

2. The piezoelectric apparatus of claim 1, wherein the adaptation element adapts the piezoelectric element to a converter for driving inductive loads in a controller for inductive loads.

3. The piezoelectric apparatus of claim 1, wherein the adaptation element has a low-pass characteristic.

4. The piezoelectric apparatus of claim 1, wherein the adaptation element is formed by passive components.

5. The piezoelectric apparatus of claim 1, wherein the adaptation element has at least one inductance.

6. The piezoelectric apparatus of claim 5, wherein the adaptation element has at least one ohmic resistance.

7. The piezoelectric apparatus of claim 6, wherein the at least one inductance and the at least one ohmic resistance are arranged in a series circuit.

8. The piezoelectric apparatus of claim 7, wherein the piezoelectric element and the adaptation element are arranged in a series circuit.

9. The piezoelectric apparatus of claim 1 wherein the controller has a converter connected to an inductive load and to the adaptation element, and the adaptation element adapts the piezoelectric element to the converter.

* * * * *